United States Patent
Daube et al.

(10) Patent No.: US 8,230,709 B2
(45) Date of Patent: Jul. 31, 2012

(54) MEASURING STRAIGHTNESS OF AN ELONGATED ROLLED WORKPIECE

(75) Inventors: Thomas Daube, Duisburg (DE); Thomas Nerzak, Gelsenkirchen (DE)

(73) Assignee: SMS Meer GmbH, Moenchengladbach (DE)

( * ) Notice: Subject to any disclaimer, the term of this patent is extended or adjusted under 35 U.S.C. 154(b) by 988 days.

(21) Appl. No.: 12/008,360

(22) Filed: Jan. 10, 2008

(65) Prior Publication Data

US 2009/0044583 A1    Feb. 19, 2009

(30) Foreign Application Priority Data

Jan. 15, 2007  (DE) .......................... 10 2007 002 982
Dec. 6, 2007  (DE) .......................... 10 2007 059 185

(51) Int. Cl.
  *B21B 37/28* (2006.01)
(52) U.S. Cl. .............. 72/9.1; 72/11.7; 72/31.03
(58) Field of Classification Search .............. 72/8.6, 72/8.9, 9.1, 11.6, 11.7, 12.7, 15.5, 16.8, 18.6, 72/18.7, 19.6, 31.03, 11.4, 12.3, 16.6, 18.4

See application file for complete search history.

(56) References Cited

U.S. PATENT DOCUMENTS

| | | | |
|---|---|---|---|
| 3,496,744 A * | 2/1970 | Shizuo et al. | 72/11.7 |
| 4,589,082 A | 5/1986 | Parker | |
| 5,794,473 A * | 8/1998 | Palzer | 72/8.9 |
| 2002/0080851 A1 | 6/2002 | Faure | 374/50 |

FOREIGN PATENT DOCUMENTS

| | | |
|---|---|---|
| DE | 19725726 | 1/1999 |
| EP | 0 935 120 | 8/1999 |
| JP | 57158507 A | 9/1982 |
| JP | 59027245 A | 7/1984 |
| JP | 02046918 A | 2/1990 |
| JP | 04022810 A | 1/1992 |
| JP | 05346325 A | 12/1993 |
| JP | 7239223 A | 9/1995 |
| JP | 07239223 A | 9/1995 |
| JP | 9026315 A | 1/1997 |
| JP | 2006313119 A | 11/2006 |
| WO | WO-9902962 | 1/1999 |

* cited by examiner

*Primary Examiner* — Debra Sullivan
(74) *Attorney, Agent, or Firm* — Andrew Wilford

(57) ABSTRACT

An elongated workpiece is treated, e.g. rolled, in a production system where treatment devices move the workpiece longitudinally in a horizontal travel direction and at a generally constant travel speed along a horizontal longitudinal path and a control computer is connected to the treatment devices. Straightness of the workpiece is measured by gripping the workpiece at a pair of longitudinally spaced supports, applying tension to a longitudinally extending horizontal portion of the workpiece between the supports, and continuously moving the workpiece in the travel direction at the travel speed with a lower surface of the portion substantially unsupported. At least periodically a vertical spacing is measured between the portion and a straight longitudinal reference line extending in the direction between the supports parallel to the workpiece at the supports. The vertical-spacing measurement are fed to the computer for use controlling the devices.

8 Claims, 2 Drawing Sheets

MEASURING STRAIGHTNESS OF AN ELONGATED ROLLED WORKPIECE

FIELD OF THE INVENTION

The present invention relates to a method of and apparatus for measuring straightness. More particularly this invention concerns the straightness of a continuously passing elongated workpiece, such as a rolled rail, bar, or rod, during the production thereof.

BACKGROUND OF THE INVENTION

It is known to determine the straightness of a profile workpiece, an I-beam for example, by placing a support bar on its flange and to measure the straight line relative to a spanned wire. Such manual measurement takes a lot of time and, because it cannot normally be done while the process is running, leads to down time and production losses.

For automated measurement and determination of the straightness of rails and profiles on a continuously passing workpiece, it is known from the prior art to utilise laser measuring devices and/or methods. In doing so, the rail is moved across a roller bed at approximately 1 m/s and the spacing between the laser head and the rail is measured. This procedure makes it possible to determine the waviness (straightness only along short distances, e.g. 1 m). This system, a so-called optical ruler, combines multiple simultaneous position measurements at multiple points in relation to the optical-ruler reference. This laser-measurement method becomes much less effective at higher speeds, for example 10 m/s, because the actual movement of the profile or elongated workpiece, such as bouncing on the roller table or oscillations, distorts the measured result, creating a disturbance variable that greatly reduces the accuracy of the measurement obtained.

A different measurement method and apparatus is disclosed in EP 0 935 120. In it, the straightness of an elongated workpiece is ascertained using multiple weight sensors spaced along the workpiece. The elongated workpiece is contacted at defined points and the workpiece weight is determined at each point. The weight varies longitudinally due to the shape of the long material or workpiece or its curvature, so that the straightness can be ascertained therefrom. Such a system can however only be used in continuous pass-through under limited conditions. In addition, the friction and other effects resulting from contact with the underlying roller table are undetermined and make the readings less accurate.

OBJECTS OF THE INVENTION

It is therefore an object of the present invention to provide an improved system for measuring straightness in a passing continuous workpiece.

Another object is the provision of such an improved system for measuring straightness in a passing continuous workpiece that overcomes the above-given disadvantages, in particular that works on the fly so that the production process can continue while measurements are taken.

SUMMARY OF THE INVENTION

An elongated workpiece is treated, e.g. rolled, in a production system where treatment devices move the workpiece longitudinally in a horizontal travel direction and at a generally constant travel speed along a horizontal longitudinal path and a control computer is connected to the treatment devices. Straightness of the workpiece is measured according to the invention by gripping the workpiece at a pair of longitudinally spaced supports, applying tension to a longitudinally extending horizontal portion of the workpiece between the supports, and continuously moving the workpiece in the travel direction at the travel speed with a lower surface of the portion substantially unsupported. At least periodically a vertical spacing is measured between the portion and a straight longitudinal reference line extending in the direction between the supports parallel to the workpiece at the supports. The vertical-spacing measurement are fed to the computer for use controlling the devices.

The invention is based on the discovery that it is necessary to create a defined situation or condition over a free, unsupported portion of the elongated workpiece while at the same time not interfering with the continuous longitudinal movement of the workpiece. This is done according to the invention by means of the two-part fixed support. The straightness of the free unsupported portion is easily determined by measuring a vertical spacing, e.g. by means of laser measuring devices, between the unsupported portion and a straight line or plane that, for instance is parallel the upper surface of the workpiece where it is held in the supports. The workpiece will inherently droop somewhat in the portion because the only thing affecting its vertical position is gravity. The biggest factor, presuming a workpiece of the same material at the same temperature, for instance, affecting this deflection or droop is therefore the weight of the workpiece, which in turn is a function of straightness.

The measurement can advantageously be done in various curvature planes. Optionally, twisting of the elongated workpiece can also be ascertained via a predetermined elastic torsion. For further optimization in the determination of the straight line, the geometrical moment of inertia of the elongated workpiece can also be taken into account advantageously by measuring the workpiece shape, e.g. the flange width.

According to a preferred embodiment of the invention, the elongated workpiece is acted on by a force across its free, unsupported portion and is elastically deflected by a predetermined amount. The influence of the disturbance variables, in particular from vibration for instance caused by its movement, is markedly reduced hereby and the measured result is much more precise in comparison to a deflection or excursion due to its own weight alone, which is then advantageously taken into account and compensated out of the force causing the deflection. The deflection can be ascertained by a laser measuring device.

In this way, even at high speeds of a continuously passing workpiece, continuous monitoring of straightness and documentation for quality management are possible, without autogenous movements of the elongated workpiece being able to distort the measured result. In addition, the measured results can be fed directly back to a rolling and in particular straightening process in a roller straightening machine.

In an apparatus according to the invention, an upstream holder and, at the spacing therefrom, in the travel direction of the workpiece, a downstream holder act on the continuously passing elongated workpiece in the measuring apparatus, and a free unsupported portion of the elongated workpiece is formed between the holders. In this way, a defined position can be set despite the leak of support for the unsupported portion of the elongated workpiece.

An advantageous embodiment of the invention provides that, in the free, unsupported portion, a force applying means, preferably a hydraulic cylinder, is provided that deflects the elongated workpiece in a controlled manner in one transverse direction with elastic deformation. Measurement precision is improved in this manner by exceeding and compensating for deflection from the weight of the elongated workpiece.

According to a preferred embodiment of the invention, each holder has at least one roller pair in turn comprising an upper and a lower roller flanking the elongated workpiece as it passes through, with the force-applying means being connected to a working roller pressing down against the elongated workpiece. The roller pairs guarantee both the continuous, fast travel of the elongated workpiece and its reliable holding, it being advantageous to press the rollers against the passing elongated workpiece.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

SPECIFIC DESCRIPTION

Figure 1:
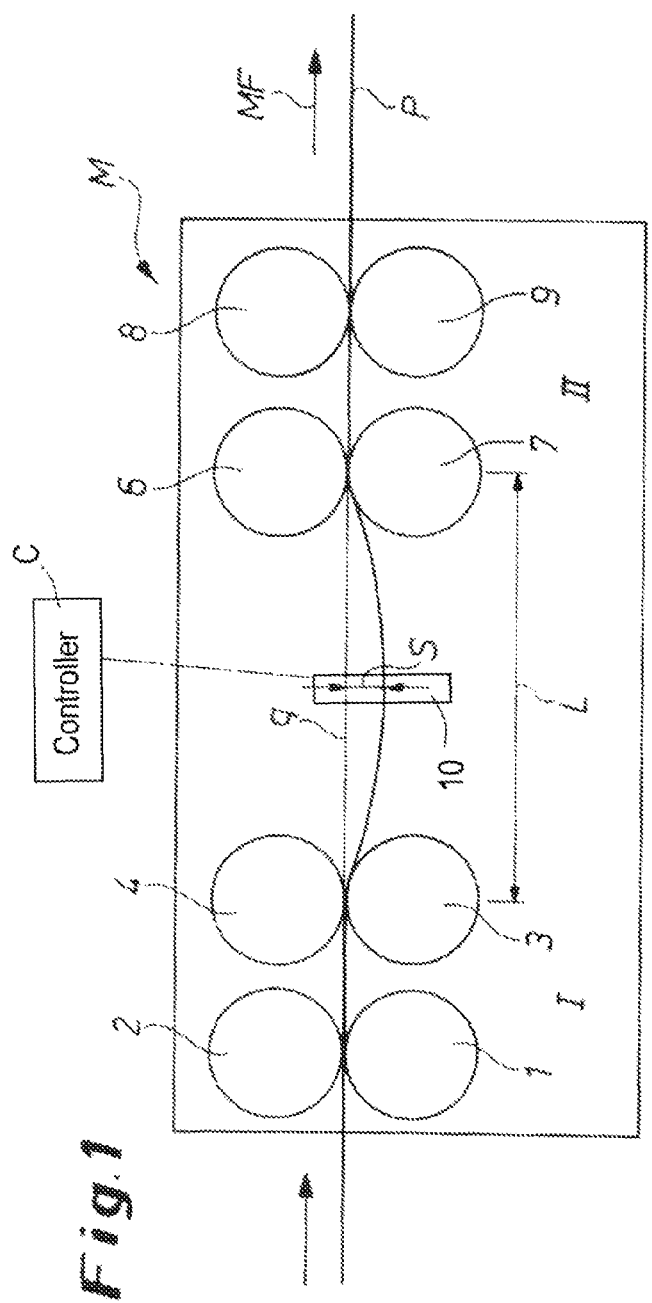
FIG. 1 is a largely schematic side view of a measuring apparatus according to the invention.

As seen in FIG. 1 a measuring apparatus M comprises two holder assemblies I and II set at a spacing from one another in a horizontal travel direction MF with two roller pairs 1, 2; 3, 4 and 5, 6; 1, 8, including upper rolls 2, 4, 6 and 8 juxtaposed with respective lower rolls 1, 3, 7 and 9. The holders I and II grip an elongated workpiece P, e.g. a rolled support profile or a rail, continuously passing through the measuring apparatus M in the workpiece-travel direction MF. In passing through, the elongated workpiece P has a defined-length, unsupported portion L between the holders I and II. In this unsupported portion, the elongated workpiece P has a deflection S created by its own weight, which can be increased in a predetermined manner with elastic deformation by acting on it with a force F. A straight line q projected mathematically above the unsupported portion L makes it possible using a suitable laser-type measuring means 10 to ascertain the extent of the deflection S and the resulting force and to determine a straight line q as a function of S and F. The measured values can be fed to a higher-level central control computer C.

Figure 2:
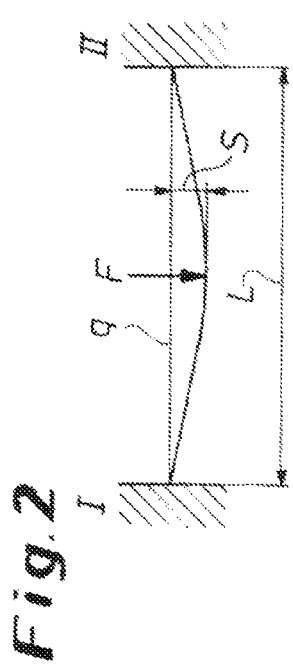
FIG. 2 is a diagram illustrating the method of this invention.

FIG. 2 illustrates schematically the relationships for the respective instantaneous measurement in a two-part fixed support, namely between holders I and II formed by roller pairs 1, 2 and 3, 4 and 6, 7 and 6, 9.

Figure 3:
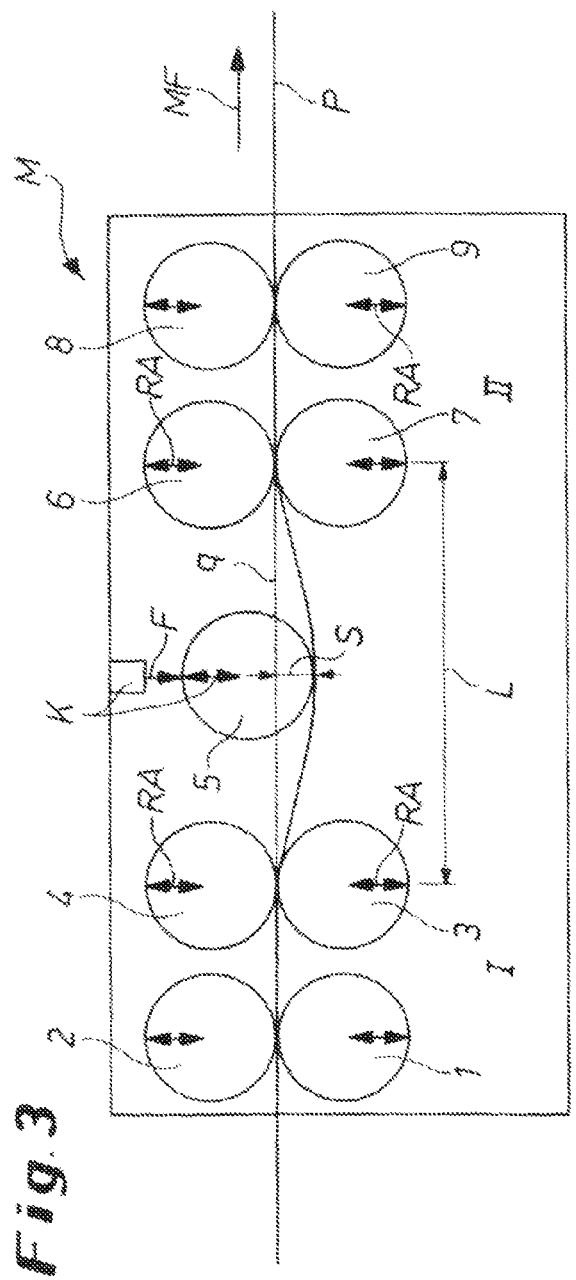
FIG. 3 is a view like FIG. 1 of another apparatus according to the invention.

FIG. 3 shows that the individual or at least some of the individual rollers of the roller pairs of holders I and II can be urged against the elongated workpiece P using schematically indicated roller actuators RA. In addition, in the longitudinal center of the top face of the unsupported portion L there is a working roller 5 that urged downward by an actuator K so that the roller 5 presses down against the elongated workpiece P and deflects it only elastically, not plastically.

Figure 4:
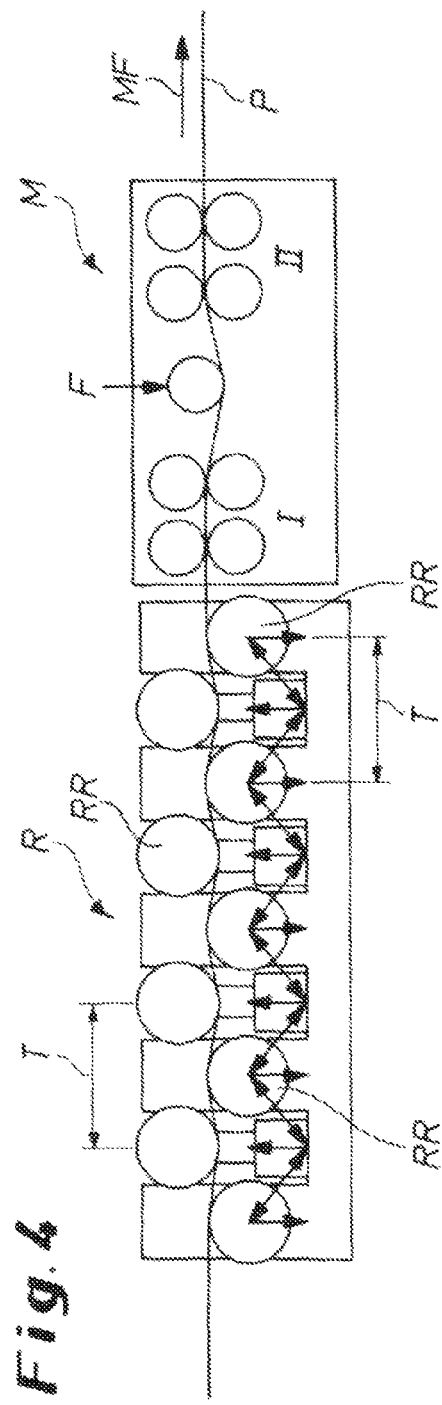
FIG. 4 shows how the apparatus is used in a rolling production system.

FIG. 4 shows the combination of the above-described measuring apparatus with a roller-type straightening machine R having upper and lower rollers RR set at a predetermined spacing T. Here the measuring apparatus M downstream of is downstream of the machine R, but it could also be upstream thereof or of another such treatment device. Even at high speeds of continuous travel, for example 10 m/s, continuous monitoring of straightness and documentation (quality management) with the use of the central computer C, which is also connected to the machine R to control it in accordance with any deviations from straightness detected by the apparatus M, are possible. Direct feedback to the straightening process of the upstream roller-type straightening machine R is also possible without a time delay. Alternatively, the measuring apparatus M can be positioned upstream of the roller-type straightening machine R to optimize the system.

We claim:

1. A method of measuring straightness of an elongated rolled-rail, bar, or rod workpiece in a production system where treatment devices including a straightening machine move the workpiece longitudinally in a horizontal travel direction and at a generally constant travel speed along a horizontal longitudinal path and a control computer is connected to the treatment devices, the method comprising the steps of:

gripping the workpiece at a pair of longitudinally spaced supports, supporting a longitudinally extending horizontal portion of the workpiece between the supports, and continuously moving the workpiece in the travel direction at the travel speed with a lower surface of the portion substantially unsupported such that the workpiece is downwardly deflected primarily by its weight;

at least periodically measuring a vertical spacing between the portion and a straight longitudinal reference line extending in the direction between the supports parallel to the workpiece at the supports; and feeding the vertical-spacing measurement to the computer for use controlling the straightening machine.

2. The method defined in claim 1 wherein the vertical spacing is measured by a laser.

3. The method defined in claim 1, further comprising the steps of:

determining the position of the line and straightness of the workpiece in the portion by determining a shape of the portion and ascertaining therefrom a geometrical moment of inertia.

4. The method defined in claim 1, further comprising the step of taking into account forces impinging on the supports to provide additional compensation for disturbing influences affecting precision of the straightness measurement.

5. The method defined in claim 4 wherein one of the disturbing influences is the actual weight of the workpiece.

6. The method defined in claim 1 wherein the vertical spacing is measured at several locations spaced longitudinally along the portion.

7. The method defined in claim 1 wherein the treatment devices include a roll train.

8. In a production system where treatment devices including a straightening machine move an elongated rolled-rail, bar, or rod workpiece longitudinally in a horizontal travel direction and at a generally constant travel speed along a horizontal longitudinal path and a control computer is connected to the treatment devices, an apparatus for measuring straightness of the workpiece, the apparatus comprising:

upstream and downstream support means for gripping the workpiece at a pair of longitudinally spaced locations, supporting a longitudinally extending horizontal portion of the workpiece between the locations, and continuously moving the workpiece in the travel direction at the travel speed with a lower surface of the portion substantially unsupported such that the workpiece is downwardly deflected primarily by its weight; and sensor means for at least periodically measuring a vertical spacing between the portion and a straight longitudinal reference line extending in the direction between the supports parallel to the workpiece at the supports and for feeding the vertical-spacing measurement to the computer for use controlling the treatment machine.

* * * * *